US009717134B2

(12) United States Patent
Zar

(10) Patent No.: US 9,717,134 B2
(45) Date of Patent: Jul. 25, 2017

(54) TECHNIQUE FOR CONTROLLING ORDER OF SELECTION

(71) Applicant: COMPULITE SYSTEMS (2000) LTD, Hod-Hasharon (IL)

(72) Inventor: Lior Zar, Poryia Illit (IL)

(73) Assignee: COMPULITE SYSTEMS (2000) LTD., Hod-Hasharon (IL)

( * ) Notice: Subject to any disclaimer, the term of this patent is extended or adjusted under 35 U.S.C. 154(b) by 298 days.

(21) Appl. No.: 14/468,575

(22) Filed: Aug. 26, 2014

(65) Prior Publication Data

US 2015/0181676 A1 Jun. 25, 2015

(30) Foreign Application Priority Data

Dec. 19, 2013 (IL) ........................................ 230063

(51) Int. Cl.
*G06F 17/30* (2006.01)
*H05B 37/02* (2006.01)

(52) U.S. Cl.
CPC ................................ *H05B 37/029* (2013.01)

(58) Field of Classification Search
CPC .. H05B 37/0209; H05B 37/029; H05B 30/02; H05B 37/02; G06F 17/30247; G06F 17/30265; G06F 17/30817; G06F 17/30843; G06F 17/50; G06F 17/5009; G06F 17/5081; G06F 19/3418; G06F 19/3468; G02B 5/18; G03H 1/10; F25D 23/00; F21V 14/08; F21V 14/68
See application file for complete search history.

(56) References Cited

U.S. PATENT DOCUMENTS

| | | | | |
|---|---|---|---|---|
| 4,216,649 | A | 8/1980 | Ichikawa et al. | |
| 4,575,816 | A | 3/1986 | Hendrickson et al. | |
| 2003/0057887 | A1 * | 3/2003 | Dowling | H05B 37/029 315/291 |
| 2005/0128751 | A1 * | 6/2005 | Roberge | F21K 9/00 362/276 |
| 2005/0248299 | A1 * | 11/2005 | Chemel | H05B 37/029 315/312 |
| 2005/0275626 | A1 * | 12/2005 | Mueller | H05B 37/029 345/156 |
| 2006/0273741 | A1 * | 12/2006 | Stalker, III | G05F 1/00 315/291 |
| 2011/0301441 | A1 * | 12/2011 | Bandic | A61B 5/0059 600/306 |
| 2012/0078393 | A1 * | 3/2012 | Kotb | H05B 37/0272 700/90 |
| 2012/0227575 | A1 | 9/2012 | Nakagawa et al. | |

* cited by examiner

*Primary Examiner* — Anh Ly
(74) *Attorney, Agent, or Firm* — Browdy and Neimark, P.L.L.C.

(57) ABSTRACT

A technique for controlling order of selecting elements from an ordered set of N elements, the technique provides applying to the ordered set a mathematical function P converting the order, in which the elements are preliminarily ordered in the set, into a desired order defined by the function P. The elements may further be selected from the set according to the new order defined by the function P. The elements in the set comprise at least one of the following: devices, items, parameters, values.

18 Claims, 14 Drawing Sheets

$F(t) = t + i$ N=10

| Name | Value 1 | Value 2 | Value 3 | Value 4 | Value 5 | Value 6 | Value 7 | Value 8 | Value 9 | Value 10 |
|---|---|---|---|---|---|---|---|---|---|---|
| i1 \ t | 1 | 2 | 3 | 4 | 5 | 6 | 7 | 8 | 9 | 10 |
| 0 | 1 | 2 | 3 | 4 | 5 | 6 | 7 | 8 | 9 | 10 |
| 1 | 2 | 3 | 4 | 5 | 6 | 7 | 8 | 9 | 10 | 11 |
| 2 | 3 | 4 | 5 | 6 | 7 | 8 | 9 | 10 | 11 | 12 |
| 3 | 4 | 5 | 6 | 7 | 8 | 9 | 10 | 11 | 12 | 13 |
| 4 | 5 | 6 | 7 | 8 | 9 | 10 | 11 | 12 | 13 | 14 |
| 5 | 6 | 7 | 8 | 9 | 10 | 11 | 12 | 13 | 14 | 15 |
| 6 | 7 | 8 | 9 | 10 | 11 | 12 | 13 | 14 | 15 | 16 |
| 7 | 8 | 9 | 10 | 11 | 12 | 13 | 14 | 15 | 16 | 17 |
| 8 | 9 | 10 | 11 | 12 | 13 | 14 | 15 | 16 | 17 | 18 |
| 9 | 10 | 11 | 12 | 13 | 14 | 15 | 16 | 17 | 18 | 19 |
| 10 | 11 | 12 | 13 | 14 | 15 | 16 | 17 | 18 | 19 | 20 |

$F(t) = t + i$ N=10

| Name | Value 1 | Value 2 | Value 3 | Value 4 | Value 5 | Value 6 | Value 7 | Value 8 | Value 9 | Value 10 |
|---|---|---|---|---|---|---|---|---|---|---|
| i2 / t | 10 | 9 | 8 | 7 | 6 | 5 | 4 | 3 | 2 | 1 |
| 0 | 10 | 9 | 8 | 7 | 6 | 5 | 4 | 3 | 2 | 1 |
| 1 | 11 | 10 | 9 | 8 | 7 | 6 | 5 | 4 | 3 | 2 |
| 2 | 12 | 11 | 10 | 9 | 8 | 7 | 6 | 5 | 4 | 3 |
| 3 | 13 | 12 | 11 | 10 | 9 | 8 | 7 | 6 | 5 | 4 |
| 4 | 14 | 13 | 12 | 11 | 10 | 9 | 8 | 7 | 6 | 5 |
| 5 | 15 | 14 | 13 | 12 | 11 | 10 | 9 | 8 | 7 | 6 |
| 6 | 16 | 15 | 14 | 13 | 12 | 11 | 10 | 9 | 8 | 7 |
| 7 | 17 | 16 | 15 | 14 | 13 | 12 | 11 | 10 | 9 | 8 |
| 8 | 18 | 17 | 16 | 15 | 14 | 13 | 12 | 11 | 10 | 9 |
| 9 | 19 | 18 | 17 | 16 | 15 | 14 | 13 | 12 | 11 | 10 |
| 10 | 20 | 19 | 18 | 17 | 16 | 15 | 14 | 13 | 12 | 11 |

Example 1 of 2D function P:
P(X) = X N=10

| N Elements | Value 1 | Value 2 | Value 3 | Value 4 | Value 5 | Value 6 | Value 7 | Value 8 | Value 9 | Value 10 | |
|---|---|---|---|---|---|---|---|---|---|---|---|
| Xi | 0 | 1 | 2 | 3 | 4 | 5 | 6 | 7 | 8 | 9 | <-- X |
| Yi=P(Xi) | 0 | 1 | 2 | 3 | 4 | 5 | 6 | 7 | 8 | 9 | <-- Y |

X - ordered set/vector of N elements

Y - vector of selection indexes for the N elements

Example 2 of 2D function P:

$P(X) = Xmax - Xi$ N=10

| N Elements | Value 1 | Value 2 | Value 3 | Value 4 | Value 5 | Value 6 | Value 7 | Value 8 | Value 9 | Value 10 | |
|---|---|---|---|---|---|---|---|---|---|---|---|
| Xi | 0 | 1 | 2 | 3 | 4 | 5 | 6 | 7 | 8 | 9 | <-- X |
| Yi=P(Xi) | 9 | 8 | 7 | 6 | 5 | 4 | 3 | 2 | 1 | 0 | <-- Y |

X - ordered set/vector of N elements

Y - vector of selection indexes for the N elements

Example 3 of 2D function P:

$$Y = P(X') = X' \quad N = 21$$

| | | | | | | | | | | | | | | | | | | | | | | |
|---|---|---|---|---|---|---|---|---|---|---|---|---|---|---|---|---|---|---|---|---|---|---|
| Xi | 0 | 1 | 2 | 3 | 4 | 5 | 6 | 7 | 8 | 9 | 10 | 11 | 12 | 13 | 14 | 15 | 16 | 17 | 18 | 19 | 20 | <-- X |
| Xi' | 0 | 0.05 | 0.1 | 0.15 | 0.2 | 0.25 | 0.3 | 0.35 | 0.4 | 0.45 | 0.5 | 0.55 | 0.6 | 0.65 | 0.7 | 0.75 | 0.8 | 0.85 | 0.9 | 0.95 | 1 | <-- X' |
| P(Xi')=Yi | 0 | 0.05 | 0.1 | 0.15 | 0.2 | 0.25 | 0.3 | 0.35 | 0.4 | 0.45 | 0.5 | 0.55 | 0.6 | 0.65 | 0.7 | 0.75 | 0.8 | 0.85 | 0.9 | 0.95 | 1 | <-- Y |

X - ordered set/vector of N elements
X' - normalized set/vector of N elements
Y - vector of selection indexes for the N elements Example 4 of 2D function P:

$$Y = P(X') = 1 - X' \qquad N = 21$$

| Xi | 0 | 1 | 2 | 3 | 4 | 5 | 6 | 7 | 8 | 9 | 10 | 11 | 12 | 13 | 14 | 15 | 16 | 17 | 18 | 19 | 20 | <-- X |
|---|---|---|---|---|---|---|---|---|---|---|---|---|---|---|---|---|---|---|---|---|---|---|
| Xi' | 0 | 0.05 | 0.1 | 0.15 | 0.2 | 0.25 | 0.3 | 0.35 | 0.4 | 0.45 | 0.5 | 0.55 | 0.6 | 0.65 | 0.7 | 0.75 | 0.8 | 0.85 | 0.9 | 0.95 | 1 | <-- X' |
| P(Xi')=Yi | 1 | 0.95 | 0.9 | 0.85 | 0.8 | 0.75 | 0.7 | 0.65 | 0.6 | 0.55 | 0.5 | 0.45 | 0.4 | 0.35 | 0.3 | 0.25 | 0.2 | 0.15 | 0.1 | 0.05 | 0 | <-- Y |

X - ordered set/vector of N elements
X' - normalized set/vector of N elements
Y - vector of selection indexes for the N elements Example 5 of 2D function P:

$$Y = P(X') = |1 - 2 * (|1 - 2X'|)| \qquad N = 21$$

| Xi | 0 | 1 | 2 | 3 | 4 | 5 | 6 | 7 | 8 | 9 | 10 | 11 | 12 | 13 | 14 | 15 | 16 | 17 | 18 | 19 | 20 | <-- X |
|---|---|---|---|---|---|---|---|---|---|---|---|---|---|---|---|---|---|---|---|---|---|---|
| Xi' | 0 | 0.05 | 0.1 | 0.15 | 0.2 | 0.25 | 0.3 | 0.35 | 0.4 | 0.45 | 0.5 | 0.55 | 0.6 | 0.65 | 0.7 | 0.75 | 0.8 | 0.85 | 0.9 | 0.95 | 1 | <-- X' |
| P(Xi')=Yi | 1 | 0.8 | 0.6 | 0.4 | 0.2 | 0 | 0.2 | 0.4 | 0.6 | 0.8 | 1 | 0.8 | 0.6 | 0.4 | 0.2 | 0 | 0.2 | 0.4 | 0.6 | 0.8 | 1 | <-- Y |

X - ordered set/vector of N elements
X' - normalized set/vector of N elements
Y - vector of selection indexes for the N elements Example 6 of 2D function P:

$$Y = P(X') = \frac{\sin(2\pi X' - \pi)}{2} + 0.5 \qquad N = 21$$

| Xi | 0 | 1 | 2 | 3 | 4 | 5 | 6 | 7 | 8 | 9 | 10 | 11 | 12 | 13 | 14 | 15 | 16 | 17 | 18 | 19 | 20 | <-- X |
|---|---|---|---|---|---|---|---|---|---|---|---|---|---|---|---|---|---|---|---|---|---|---|
| Xi' | 0 | 0.05 | 0.1 | 0.15 | 0.2 | 0.25 | 0.3 | 0.35 | 0.4 | 0.45 | 0.5 | 0.55 | 0.6 | 0.65 | 0.7 | 0.75 | 0.8 | 0.85 | 0.9 | 0.95 | 1 | <-- X' |
| P(Xi')=Yi | 0.50 | 0.35 | 0.21 | 0.10 | 0.02 | 0.00 | 0.02 | 0.10 | 0.21 | 0.35 | 0.50 | 0.65 | 0.79 | 0.90 | 0.98 | 1.00 | 0.98 | 0.90 | 0.79 | 0.65 | 0.50 | <-- Y |

X - ordered set/vector of N elements
X' - normalized set/vector of N elements
Y - vector of selection indexes for the N elements Example of 3D function P:

$$Y = P(X1', X2') = \sqrt{(X1'^2 + X2'^2)} \qquad N(X1) = N(X2) = 21$$

| X2\X1 | | -5 | -4.5 | -4 | -3.5 | -3 | -2.5 | -2 | -1.5 | -1 | -0.5 | 0 | 0.5 | 1 | 1.5 | 2 | 2.5 | 3 | 3.5 | 4 | 4.5 | 5 |
|---|---|---|---|---|---|---|---|---|---|---|---|---|---|---|---|---|---|---|---|---|---|---|
| | X2'\X1' | 0 | 0.05 | 0.1 | 0.15 | 0.2 | 0.25 | 0.3 | 0.35 | 0.4 | 0.45 | 0.5 | 0.55 | 0.6 | 0.65 | 0.7 | 0.75 | 0.8 | 0.85 | 0.9 | 0.95 | 1 |
| -5 | 0 | 0.88 | 0.84 | 0.80 | 0.76 | 0.73 | 0.70 | 0.67 | 0.65 | 0.64 | 0.63 | 0.63 | 0.63 | 0.64 | 0.65 | 0.67 | 0.70 | 0.73 | 0.76 | 0.80 | 0.84 | 0.88 |
| -4.5 | 0.05 | 0.84 | 0.80 | 0.75 | 0.71 | 0.68 | 0.64 | 0.62 | 0.59 | 0.58 | 0.57 | 0.56 | 0.57 | 0.58 | 0.59 | 0.62 | 0.64 | 0.68 | 0.71 | 0.75 | 0.80 | 0.84 |
| -4 | 0.1 | 0.80 | 0.75 | 0.71 | 0.66 | 0.63 | 0.59 | 0.56 | 0.53 | 0.52 | 0.50 | 0.50 | 0.50 | 0.52 | 0.53 | 0.56 | 0.59 | 0.63 | 0.66 | 0.71 | 0.75 | 0.80 |
| -3.5 | 0.15 | 0.76 | 0.71 | 0.66 | 0.62 | 0.58 | 0.54 | 0.50 | 0.48 | 0.46 | 0.44 | 0.44 | 0.44 | 0.46 | 0.48 | 0.50 | 0.54 | 0.58 | 0.62 | 0.66 | 0.71 | 0.76 |
| -3 | 0.2 | 0.73 | 0.68 | 0.63 | 0.58 | 0.53 | 0.49 | 0.45 | 0.42 | 0.40 | 0.38 | 0.38 | 0.38 | 0.40 | 0.42 | 0.45 | 0.49 | 0.53 | 0.58 | 0.63 | 0.68 | 0.73 |
| -2.5 | 0.25 | 0.70 | 0.64 | 0.59 | 0.54 | 0.49 | 0.44 | 0.40 | 0.36 | 0.34 | 0.32 | 0.31 | 0.32 | 0.34 | 0.36 | 0.40 | 0.44 | 0.49 | 0.54 | 0.59 | 0.64 | 0.70 |
| -2 | 0.3 | 0.67 | 0.62 | 0.56 | 0.50 | 0.45 | 0.40 | 0.35 | 0.31 | 0.28 | 0.26 | 0.25 | 0.26 | 0.28 | 0.31 | 0.35 | 0.40 | 0.45 | 0.50 | 0.56 | 0.62 | 0.67 |
| -1.5 | 0.35 | 0.65 | 0.59 | 0.53 | 0.48 | 0.42 | 0.36 | 0.31 | 0.27 | 0.23 | 0.20 | 0.19 | 0.20 | 0.23 | 0.27 | 0.31 | 0.36 | 0.42 | 0.48 | 0.53 | 0.59 | 0.65 |
| -1 | 0.4 | 0.64 | 0.58 | 0.52 | 0.46 | 0.40 | 0.34 | 0.28 | 0.23 | 0.18 | 0.14 | 0.13 | 0.14 | 0.18 | 0.23 | 0.28 | 0.34 | 0.40 | 0.46 | 0.52 | 0.58 | 0.64 |
| -0.5 | 0.45 | 0.63 | 0.57 | 0.50 | 0.44 | 0.38 | 0.32 | 0.26 | 0.20 | 0.14 | 0.09 | 0.06 | 0.09 | 0.14 | 0.20 | 0.26 | 0.32 | 0.38 | 0.44 | 0.50 | 0.57 | 0.63 |
| 0 | 0.5 | 0.63 | 0.56 | 0.50 | 0.44 | 0.38 | 0.31 | 0.25 | 0.19 | 0.13 | 0.06 | 0.00 | 0.06 | 0.13 | 0.19 | 0.25 | 0.31 | 0.38 | 0.44 | 0.50 | 0.56 | 0.63 |
| 0.5 | 0.55 | 0.63 | 0.57 | 0.50 | 0.44 | 0.38 | 0.32 | 0.26 | 0.20 | 0.14 | 0.09 | 0.06 | 0.09 | 0.14 | 0.20 | 0.26 | 0.32 | 0.38 | 0.44 | 0.50 | 0.57 | 0.63 |
| 1 | 0.6 | 0.64 | 0.58 | 0.52 | 0.46 | 0.40 | 0.34 | 0.28 | 0.23 | 0.18 | 0.14 | 0.13 | 0.14 | 0.18 | 0.23 | 0.28 | 0.34 | 0.40 | 0.46 | 0.52 | 0.58 | 0.64 |
| 1.5 | 0.65 | 0.65 | 0.59 | 0.53 | 0.48 | 0.42 | 0.36 | 0.31 | 0.27 | 0.23 | 0.20 | 0.19 | 0.20 | 0.23 | 0.27 | 0.31 | 0.36 | 0.42 | 0.48 | 0.53 | 0.59 | 0.65 |
| 2 | 0.7 | 0.67 | 0.62 | 0.56 | 0.50 | 0.45 | 0.40 | 0.35 | 0.31 | 0.28 | 0.26 | 0.25 | 0.26 | 0.28 | 0.31 | 0.35 | 0.40 | 0.45 | 0.50 | 0.56 | 0.62 | 0.67 |
| 2.5 | 0.75 | 0.70 | 0.64 | 0.59 | 0.54 | 0.49 | 0.44 | 0.40 | 0.36 | 0.34 | 0.32 | 0.31 | 0.32 | 0.34 | 0.36 | 0.40 | 0.44 | 0.49 | 0.54 | 0.59 | 0.64 | 0.70 |
| 3 | 0.8 | 0.73 | 0.68 | 0.63 | 0.58 | 0.53 | 0.49 | 0.45 | 0.42 | 0.40 | 0.38 | 0.38 | 0.38 | 0.40 | 0.42 | 0.45 | 0.49 | 0.53 | 0.58 | 0.63 | 0.68 | 0.73 |
| 3.5 | 0.85 | 0.76 | 0.71 | 0.66 | 0.62 | 0.58 | 0.54 | 0.50 | 0.48 | 0.46 | 0.44 | 0.44 | 0.44 | 0.46 | 0.48 | 0.50 | 0.54 | 0.58 | 0.62 | 0.66 | 0.71 | 0.76 |
| 4 | 0.9 | 0.80 | 0.75 | 0.71 | 0.66 | 0.63 | 0.59 | 0.56 | 0.53 | 0.52 | 0.50 | 0.50 | 0.50 | 0.52 | 0.53 | 0.56 | 0.59 | 0.63 | 0.66 | 0.71 | 0.75 | 0.80 |
| 4.5 | 0.95 | 0.84 | 0.80 | 0.75 | 0.71 | 0.68 | 0.64 | 0.62 | 0.59 | 0.58 | 0.57 | 0.56 | 0.57 | 0.58 | 0.59 | 0.62 | 0.64 | 0.68 | 0.71 | 0.75 | 0.80 | 0.84 |
| 5 | 1 | 0.88 | 0.84 | 0.80 | 0.76 | 0.73 | 0.70 | 0.67 | 0.65 | 0.64 | 0.63 | 0.63 | 0.63 | 0.64 | 0.65 | 0.67 | 0.70 | 0.73 | 0.76 | 0.80 | 0.84 | 0.88 |

<-- X1
<-- X1'

↑ X2 ↑ X2'

Fig. 4A

TECHNIQUE FOR CONTROLLING ORDER OF SELECTION

FIELD OF THE INVENTION

The present invention relates to a technique for controlling order of selection of elements from a set, and in particular—to a method and a system for controlled lighting of a stage, an arena or the like at various performances in theaters, concert halls, stadiums, circuses, etc., where lighting instruments etc. are usually activated in some order, by selecting thereof from a suitable set.

BACKGROUND OF THE INVENTION

Methods of control usually comprise affecting items to be controlled in any pre-selected order; some of control methods relate to controlling the order of selection.

U.S. Pat. No. 4,216,649A describes a function selection circuit for multi-function timepiece which has a timekeeping circuit, a display device to display output data from the timekeeping circuit, and a function circuit to provide a plurality of functions which can be selected by an external control member in a predetermined sequence. The function selection circuit has a circuit means controlled by the external control member to provide an output to enable a selection of time correction mode from said plurality of functions in the predetermined sequence.

US2012227575A describes an electronic musical instrument having a control device that controls generation of tones by the tone generation device such that tones corresponding to the sound generation instruction group are generated in the order sorted by the sorting device.

U.S. Pat. No. 4,575,816A describes a peripheral processor having an architecture wherein the function controlling information of a program is separated from portions of the sequence of execution controlling information and each are stored in the form of tables. The function controlling information takes the form of a table including a plurality of function specifying entries. The function execution sequence controlling information takes the form of a table of pointers. Other tables (guidance table, etc.) are also described.

The above references describe controlling some operations according to the order written down in a kind of a "correspondence" table.

General methods of controlling the order of selection will further be discussed using one practical though non-limiting example of the controlled lighting of a stage, where the items to be controlled may be members of a group of lighting instruments (but not only).

Stage lighting is an important component in the production of theatre, dance, opera events, as well as other performance art events.

When controlling light instruments available at a specific concert hall to obtain various light (or lighting) effects, one of the most important things to control is the order of their initiation/selection; the control of the order is usually performed in parallel with controlling parameters of each specific lighting instrument.

To control the lighting instruments, for example to perform some lighting effect on a stage, at least one parameter of the available lighting instruments (fixtures) should be controlled in some pre-determined order. Once the order is known and while it is being implemented by selecting the fixtures according to the order, the above-mentioned light properties may also be controlled by affecting parameters of the selected fixtures.

Just for the information purpose, it can be noted here that parameters of fixtures are specific physical features selected for the fixtures by their manufacturers; the parameters list may comprise such items as Pan, Tilt, a pre-selected color system (say, RGB, CMY), etc. Usually, the parameters do not directly correspond to the light properties. Due to that, in order to control a specific lighting property (for example, intensity or direction of the light beam), a combination of the given physical parameters of a fixture may be controlled together.

As has been noted above, for controlling fixtures and for creating light effects in particular, a designer usually needs to pre-determine the desired order of activating the fixtures. In the presently known control systems, it is performed by pointing out (either by a human operator or by a preliminarily composed program) of exact fixtures in a group, intended for lighting the stage during a performance. According to the program, some of the fixtures may be activated first, other fixtures may be activated there-after and so on in respective successive periods of time.

Let us call the time value "t", a so-called primitive light function "Eff", the amplitude "A" and the base (i.e. the constant)—"B". The output value "Out" of a given fixture parameter can be presented by the following notation:

$$\mathrm{Out}=B+A^{*}\mathrm{Eff}(t)$$

wherein the effect Eff can be stated as a function of light state, for example sin(t), cos(t), etc.

Let a group comprises N fixtures—say, 10 fixtures having numbers/names/IDs "1", "2", "3", "4", "5", "6", "7", "8", "9", "10", which are placed in a line above the stage in the order of their numbers.

For each fixture in the group, there will be another number which will tell the order of selection of the fixture for some activity, that another number will be so-called Selection Index SI.

For example, the first selected fixture will get SI=0 (the first one in the order), the second selected fixture: SI=1 (the second one in the order), etc.

Please keep in mind that the first selected fixture (SI=0) may be the fixture numbered "1", but it may be the one numbered "10", or any other of the N fixtures.

In order to create a time offset, the notation above may be modified as follows:

$$\mathrm{Out}=B+A^{*}\mathrm{Eff}(t+\mathrm{SI}^{*}T) \quad [1]$$

Where B is the base, A is the amplitude, t is time, Eff is a so-called "primitive light function", T is the value of the time offset. (For example, if the difference between activating different fixtures is 0.5 seconds, T=0.5.)

The same method may be applied to create a base offset or an amplitude offset. A modified formula [1] may be the following:

$$\mathrm{Out}=(B+\mathrm{SI}^{*}b)+(A+\mathrm{SI}^{*}a)^{*}\mathrm{Eff}(t+\mathrm{SI}^{*}T)$$

Where "T", "b", "a" respectively control the level of time offset, base offset and amplitude offset.

Today, to create an effect (say, the selected lamps produce a red light pulse) which begins in the center and ends on the edges of the stage (i.e., of the line of fixtures lighting the stage), a user usually selects fixtures in quite a complex order. For example, when selecting the order of activating 10 fixtures, the designer/user may "call" them in the following order:

Fixture numbers N: 5, 6, 4, 7, 3, 8, 2, 9, 1, 10.

Selection index SI: 0, 1, 2, 3, 4, 5, 6, 7, 8, 9.

Or the fixtures may be called as follows:

Fixture numbers N: 5 & 6; 4 & 7; 3 & 8; 2 & 9; 1 & 10.

Selection index SI: 0 & 0; 1 & 1; 2 & 2; 3 & 3; 4 & 4;

The above two examples present two options of what we call "a mirror order" effect.

In the first option, values of SI will be different for each of the fixtures (i.e., they are activated one after another). However, in the second option the designer assigns two different fixtures of one pair to the same value of SO (to the same selection index SI), so that two fixtures of a pair are activated simultaneously, while the pairs are activated successively.

A programmer must therefore handle N different fixtures (in other words, N IDs of the fixtures), and to introduce the required SI (the selection index), so as to bring N and SI into association suitable for the desired effect.

The described technology is complex and reminds a "table" approach mentioned above. Moreover, when an effect is programmed for a specific group of N fixtures, that effect cannot be automatically transformed/adapted to another stage where the group of fixtures comprises a different number thereof.

To the best of the Applicant's knowledge, all known lighting control consoles have no effective solution for the above-identified problem.

OBJECT AND SUMMARY OF THE INVENTION

It is therefore an object of the present invention to provide a new technique (method, system and software product) for controlling order of selection, in particular for effective control of lighting at various performances.

Still more specifically, the object of the invention may be formulated as creating a technique for lighting effects, which technique would be convertible and easily adjustable for various kinds of stages that use different groups of lighting instruments/fixtures/projectors.

Before we define the Inventor's concept, some terms should be agreed in advance.

We will consider a set of N elements (which may also be called members, items or values in this description).

In addition to a generally understood term "element", "member" "item" or "value" having a broad meaning, let us introduce a term "lighting-related element/value" which may reflect various attributes belonging to the field of stage lighting.

Let us agree that a set of N elements (as well as a set of lighting related values) may be presented as a group, as an array having various dimensions (1D, 2D, 3D, etc.), as a linear 1D vector, a 2D vector (matrix), a 3D vector (cube), etc. Let us also agree that in a set of N elements, relations there-between are somehow defined (either naturally, or by a user). In one example, relations in a set may be defined by one or more abstract attributes of the elements (values), such as name, indication, ID, specific quality, etc. In another example, relations in a set may be defined by quantitative attributes of the members, such as a number, value of a current reading, etc. In yet another example, on a set being an array, relations between the elements/values may be defined by assigning to them 1D, 2D, 3D etc. coordinates.

Let us also agree that the term "lighting-related element/value" may have at least the following different meanings:

1) a fixture;

2) a fixture item or parameter;

3) Value/reading of a fixture item or parameter;

4) Value/reading of a constant or a coefficient related to a physical variable, for example value/reading of base, amplitude, rate, time offset, etc.

As mentioned, relation between elements in the set may be defined. The set with defined relations can be called an ordered set.

In practice, and in the present description, relations of elements in the set will preferably be defined by numbers.

Such a set is considered to be an ordered set which can be presented by a vector X of N ordered elements: X=(x1, x2 . . . xN), where $x_i \in X$ (i=1, . . . N).

Let us generally note that a set of N elements may comprise uniform ones (i.e., belonging to the same meaning, for example selected from the above 4 meanings, thus forming a group of fixtures, a group of available fixture parameters, a group of possible readings of a specific parameter, a group of readings of time offset, etc.).

However, a set of N elements may be a mixed group, i.e. may comprise elements having different meanings. For example, it can be a combination formed say, by set/vector 1 of values along one axis (for example, values of Pan for a specific fixture) and by a set/vector 2 of values along an orthogonal axis (for example, values of Tilt for that specific fixture) so that each of the elements of the combined set is a fixture having some value of Tilt and some value of Pan.

According to a first aspect of the invention, the above object of the invention can be achieved by the following method.

A method for control of elements' selection from an ordered set of N elements, by applying to said set a function P converting the order in which said elements are ordered (arranged) in the set, into a desired order for further selection of the elements from the set according to the desired order defined by said function P, wherein the elements comprise at least one of the following: devices, items, parameters, values.

The method may further comprise selecting the elements from the set according to the desired order defined by the described function P. Still further, the method may comprise accessing the selected elements according to the desired order defined by said function P In the frame of the present description, the above mentioned function P is called a Pattern function.

The desired order, defined by said function, may constitute any successive and/or parallel selection of the elements from the set. The function may be selected to set the desired order as equal to or different from the original order in which the elements are arranged in the set.

The method may further comprise a step of accessing the selected elements according to the desired order, for various purposes or actions.

The accessing may comprise at least one of the following: switching said devices (on/off/changing their mode), accessing said items (say, databases or commands), initiating said parameters, setting values of parameters or coefficients, etc.

The method may be applied for controlling the order of selection from sets comprising any elements. For example, the method may control order of selecting computers from a network, or may grant access to computer databases, files, parameters in a desired order.

One preferable (but not the only) application of the method is for controlled lighting of a stage by a set of lighting devices/fixtures having multiple parameters which may be controlled as proposed.

In mathematical terms, the method for controlling sequence of selecting elements from the set of N elements may comprise:

ensuring that said set is an ordered set presentable as a vector X comprising N elements $x_i$:

$$X=(x1,x2 \ldots xN), \text{ where } x_i \in X(i=1, \ldots N); \quad [2]$$

selecting said function P (Pattern function) being at least a 2D function defined between at least two orthogonal axes, wherein a first of said at least two axes being used (by itself or with one or more additional orthogonal axes) for defining the N elements ordered in the set (e.g., for defining indexes of these N elements), and a second of said at least two axes being used for determining selection indexes reflecting the sequence/order of selecting said elements from the set;

running the function P on the vector X, so that:

$$P(X)=[P(x1),P(x2), \ldots P(xN)], \quad [3]$$

thereby controlling, by said function P, the sequence/order of selecting elements $x_i$ from the set by associating them with selection indexes $y_i$ presentable as a vector Y:

$$P(X)=Y=(y1,y2 \ldots yN), \text{ where } y_i \in Y(i=1, \ldots N). \quad [4]$$

The Pattern function is actually a function that changes the order, by creating a manner of selection of the elements $x_i$ from the set X, which manner (being it of a sequential and/or parallel character) may be and is usually different from the order according to which the elements were arranged/ordered in the set X. The Inventor's idea is therefore to control the order of selection by a function—which is totally different from the approach presently accepted in the prior art (i.e., from stating the order of selection by a predetermined set of selection indexes for each specific set, case, etc.).

The Pattern function per se is not a time-dependent function, it just puts the order of elements in the set X into any desired correspondence with the order of further selection thereof from the set.

It will be further explained that the Pattern function may be used for producing effects in time (say, lighting effects on a stage).

As mentioned, one practical implementation of the idea relates to the stage lighting; the invention makes the stage lighting easily programmable and, once programmed—easily adjustable to various groups of lighting-related values.

In the latter case, the method will be understood as a method for lighting control, the devices will be lighting devices (fixtures), the items may be internal units of the fixtures, the parameters—the lighting devices parameters, and the values—values of said parameters or values of coefficients.

Both the general and the specific methods formulated above may be fulfilled by a) selecting the elements from the set in the desired order, according to selection indexes defined by the function P;

b) accessing the selected elements in the desired order, according to selection indexes defined by the function P.

The mentioned purposes/actions may be, for example: switching any devices on or off, when the devices are elements $x_i$ of the set; obtaining information related to the elements $x_i$ being for example computer data files; performing lighting functions by using elements $x_i$ being fixtures, by activating the fixture parameters, setting values of the parameters, coefficients and constants, etc.

The selection indexes ($y_i$) are readings of the selection order/sequence. It is understood that each of the selection indexes $y_i$ respectively corresponds to element $x_i$ of the set (X), and thus indicates "an order number" of selecting the element $x_i$ from the set (X) according to the Pattern function P.

However, it should also be understood that values of the selection indexes $y_i$ may be any values computed by the function P, so that, for example: a group of different elements $x_i$ may be selected from the set (X) together/simultaneously, may be not selected at all, the elements $x_i$ of the set X may be selected in a direct order corresponding to their order in the set X, as well as may be selected in a reverse order, in any numerous complex combinations—since any order arrangement can be implemented by selecting a suitable function P.

The Pattern function may be any arbitrary function.

It should be noted that more than one function (P) may be run simultaneously to control order/sequence of selection on one or more sets of elements. In presently known systems, there is usually no practical reason to run more than one pattern function on one and the same set (attribute).

For example, if N elements of a set X1 are N brightness values of computer screens, if a primitive light function ("Eff") is sinus, and if the Pattern function P1 is a linear function being applied in the order of time offset (i.e., increasing with time) the screens will be illuminated in a periodic manner by gradually increasing the brightness up to a peak value, followed by graduate decrease of the brightness up to a bottom value, and so on, while the screens will be selected according to the order from left to right.

If elements of a set X2 are M computer screens, the primitive light function is sinus, and the Pattern function P2 is a mirror function being applied in the order of time offset, the computer screens will be activated as before, but will be selected according to the order from the center outwards. It is understood that the two functions P1 and P2 may be applied simultaneously on the two sets X1 and X2.

For lighting-related members/values, co-existence of multiple Pattern functions for simultaneous control of various aspects of lighting is very advantageous.

As mentioned above, the lighting-related values (elements of sets) may be for example fixtures themselves, parameters of the fixtures, values of the parameters, values of constants and coefficients, etc.

In one preferred version of the method, the N elements of the set are N lighting-related values.

In the above method, the lighting-related values may be selected from a non-limited list comprising at least: fixtures, fixture parameters, readings of fixture parameters, readings of amplitude, readings of base/constant, readings of rate, readings of time offset. The lighting-related values may be defined for example by name/number/indication/ID/abstract attribute/quantitative attribute, etc.

Preferably, the Pattern function is a 2D or a 3D function respectively defined between two or three orthogonal axes.

Pattern functions having dimensions greater than 2D (and respectively defined between three or more orthogonal axes) may associate position of an element/value in space (for example, location of a specific fixture in a group being a 2D or a 3D array of fixtures) with its selection index SI ($y_i$) being projection of the function P onto the mentioned orthogonal axis defining selection order of the elements/values.

However, such "more than 2D" functions (for example, a 3D Pattern function) may be run on a combined set formed by interposition of at least two sets, each defined on one of at least two mutually orthogonal axes.

Say, one of the axes may present fixtures and the other may present brightness values, or one of the axes may present Tilt values, and the other may present Pan values for at least one fixture.

Still preferably, the set of N elements (and consequently, the Pattern function) may be defined on a normalized interval on said first axis; on the normalized interval, indexes of N elements of the set are normalized to vary between 0 and 1 (or 0% and 100%).

It can be said that a normalized set/vector ||X|| is defined on the normalized interval:

$$\|X\|=(x1',x2'\ldots xN'),\ \text{where } x_i\in\|X\|(i=1',\ldots N'). \qquad [5]$$

The normalized vector ||X|| is such, that indexes of N elements thereof are normalized to vary between 0 and 1 (or 0% and 100%).

(For example, x1' is an element having index 0, and xN' is an element having index 1. The remaining elements of the ||X|| have non-integer selection indexes.)

It should be noted that if the-above mentioned combined set is formed by interposition of two or more sets, wherein each of the sets is defined on one of mutually orthogonal axes, each of said sets may be normalized on its axis, in its corresponding interval between 0 and 1. Further, such two or more sets may comprise different numbers N, M, . . . of elements (N≠M≠ . . . ), and will still form a combined set.

Normalization of at least one of the intervals where the Pattern function P is defined, allows obtaining one and the same effect (defined by the same Pattern function) on different, changeable sets of elements.

In practice, owing to that feature, the function P will have the same shape both on a set of 10 elements, and on a set of 100 elements, since these two sets will be perceived by the function equally, due to the same normalized interval they occupy. The order of selection of the elements in these two cases will be defined similarly, by the same function P, though will comprise different number of selection indexes. In case of lighting applications, a light effect programmed using the function P for one set of N fixtures, will be applicable to any other set of M fixtures, where N≠M.

Further, the intervals on the respective first and second orthogonal axes, where sets X and Y are respectively defined, may be both normalized.

For example, when the Pattern function is a 2D function for selecting order of lighting-related values, it may be defined between a first and a second intervals on said two orthogonal axes:

- the first interval being a normalized interval suitable for determining any element of the set X of N lighting-related values;
- the second interval (optionally) being a normalized selection order interval for obtaining normalized Selection Indexes $y_i$ for the lighting-related values, according to the Pattern function.

In a further, and one of the preferred versions of the method, the Pattern function may control order/sequence of selection of the lighting-related values from the set X for creating a light effect; in this case the Pattern function may be called a Light effect function.

It should be noted that the above-mentioned primitive light function (marked "Eff" in the background description) which runs on a specific fixture, may be any desired function of time. In one specific case, it may be a constant function not changing with time. In another specific case, it may be a Pattern function according to the invention. Primitive light functions may be combined with one or more Pattern functions applied to one or more fixtures, and various light effects in time may be created.

Ways of combining Pattern functions with a primitive light function will be explained below.

In view of the above, in still a further version of the method, the Pattern function may be designed for creating a light effect in time, wherein the second axis serves also as the time axis. In this case, the interval of Selection Indexes SI ($y_i$) will reflect duration of the light effect.

A usual time dependent light function, i.e. the primitive light effect function ("Eff"), when run on specific elements (for example, on a group of fixtures, or on a fixture parameter—for example, intensity) may be written down as follows:

$$\text{Output}=B+A*\text{Eff}(t),\ \text{where} \qquad [6]$$

Output—value related to the element on which the primitive light effect function is run;

B is a base (constant) predetermined for the function;

A is an amplitude of the function;

t—time

As has been mentioned in the background, prior art teaches creating a light effect by directly introducing/using a necessary selection index (SI) of a fixture from a set, for activating that fixture within a period of time offset T, as in formula [1]:

$$\text{Output}=B+A*\text{Eff}(t+\text{SI}*T) \qquad [1]$$

(where B—is a base, for example a constant

A is amplitude

T is time offset)

The Invention, alternatively or in addition to a primitive light function such as [6] or [1], enables creating a light effect by using a Pattern function (say, P1) which will automatically produce the selection index from elements $x_i$ of the ordered set X of fixtures and thus will be able, for example, to activate them with time offset T in the order calculated by that pattern function from $x_i$:

$$\text{SI}=P(x_i)$$

Taking into account its specific base, amplitude and an time offset values (marked here by A,B,T for simplicity), [1] may be rewritten as a combined light effect function:

$$\text{Output}=B+A*\text{Eff}(t+P(x_i)T). \qquad [7]$$

In this manner, "Output" of such a combined light effect will be controlled by a Pattern function (for example P) and a primitive light function (for example, Eff=Sin), with time steps equal to T, i.e., by selecting for this light effect elements $x_i$ of the set X in the order ($y_i$) obtained according to the function P1. If $x_i$ are N fixtures in the ordered set X, and if the action to be done upon selection is switching them on, so the function P will select the fixtures to be switched on, according to a new order Y=(y1, . . . yN) and with the time offset T. The fixtures being switched on will change their intensity according to the sinusoidal function with the selected B and A.

As has been mentioned, in practice the method may include simultaneous control of the desired order of selection for various sets of lighting-related values, by one or more Pattern functions.

For example, a complex light effect may comprise further controlled selection of base, amplitude, rate, time offset by a number of pattern functions, such as Pb, Pa, Pr, Pto.

For example, such a combined light effect function may be written down as:

$$\text{Output}=B+(Pb(x_i)*B')+(A+(Pa(x_i)*A'))*\text{Eff}((t*(Pr(x_i)*R'))+(Pto(x_i)*TO')); \quad [8]$$

wherein:

Eff—a light effect function; may be a primitive light function of time; however in another modification of [8], Eff may be replaced by a pattern function;

Pb is a pattern function to control the base selection order; B'—coefficient of the Pb;

Pa is a pattern function to control the amplitude selection order; A'—coefficient of Pa;

Pr is a pattern function to control the rate selection order; R'—rate coefficient of Pr;

Pto is a pattern function to control the time offset selection order; TO'—coefficient of Pto.

The selection is preferably performed on the same set X of fixtures xi.

The result marked as "Output" presents output values of the complex/combined light effect which may vary in time, for example as follows:

the fixtures intensity may be controlled by the same primitive function Eff=Sin;

pattern functions Pa, Pb, Pr, Pto are functions, all selecting their order based on the ordered set of fixtures X.

If all the functions are not constants, the fixtures will change their intensity according to a sinusoidal graph, wherein the base of the graph will vary according to function Pb, its amplitude will be regulated by function Pa, its rate or frequency will be changed by function Pr, and the time offset of selecting the fixtures will be changeable by function Pto.

It can be understood from the formula [8], that if the order of elements (fixtures) $x_i$ in the set X was "left to right", any of the above pattern functions is able to change, in its own manner, the order of selecting of its respective value (base, amplitude, rate, time offset). For example, the base order may be set as "left to right", the amplitude order—as "right to left", and the time offset as "center to edges". As mentioned, in this example the set X and the order of elements $x_i$ in the set X is the same for all parts of the formula. However, different sets X1, X2 . . . of different elements may be used as well. For example, a set of lighting parameters or a set of values of a parameter may additionally be used in another version of the equation [8].

According to a second aspect of the invention, there is also provided a control system (for example a system for lighting control), capable of implementing the above-defined method.

It may be a control system for controlling a manner of elements' selection from an ordered set of N elements, wherein the system is adapted to apply to said set at least one function P capable of converting the order, in which said elements are arranged in the set, into a desired order for further selecting the elements from the set, wherein the elements comprise at least one of the following: devices, items, parameters, values.

The control system may be designed for creating and controlling a light effect, wherein said elements are lighting-related elements, the system being adapted to calculate a combined light effect function utilizing said function P, and to access the selected elements to create and control the light effect by applying to them said combined light effect function.

The system may comprise:

a central processor unit (CPU), a Memory unit comprising a database of the elements for forming sets there-from, a library of P-functions, a library of Light Effect functions [Eff(t)] and optionally a block for selecting coefficients for the P-functions and the Light Effect functions;

a graphical user interface (GUI) for visualizing the controlled selection of the elements, functions, parameters and coefficients for the light effect; for example GUI may comprise visual means for arranging sets of elements from the database of elements;

The CPU may comprise means for ordering the selected set/s and optionally for normalizing the order in said at least one set; CPU should be adapted to calculate a resulting (combined) function of the light effect(s) based on all the selected data.

The system may further comprise a block for computer simulation of the light effects calculated by the CPU based on the selected data, the simulation block should provide feedback to an operator/software, to finally adjust selection of the initial data (sets, functions, coefficients).

The system may also comprise an interface (I/F) for communicating control data from the central processor unit to the elements of the selected sets, i.e. to the physical items.

According to yet a further aspect of the invention, there is also provided a software product comprising computer implementable instructions and/or data for carrying out the mentioned method, such instructions and/or data being stored on an appropriate computer readable storage medium so that the software is capable of enabling operations of said method when used in a computer system.

Still further, the present patent application also protects a computer readable storage medium storing the software product.

The invention will be further disclosed and illustrated in detail as the description proceeds.

BRIEF DESCRIPTION OF THE DRAWINGS

The invention will be further described with reference to the following non-limiting drawings, in which:

FIGS. 1A, 1B, 1C, 1D, 1E, 1F (prior art) explain a state of the art technique for creating effects on an array of N elements, with a fixed selection order introduced for control.

FIGS. 4A, 4B present a table and a schematic graphical presentation of an exemplary 3D-Cone Pattern function for controlling order of selection of ordered elements arranged in a bi-dimensional array. Intervals of the arguments and the function are normalized.

DETAILED DESCRIPTION OF PREFERRED EMBODIMENTS

Figures 1A, 1B:
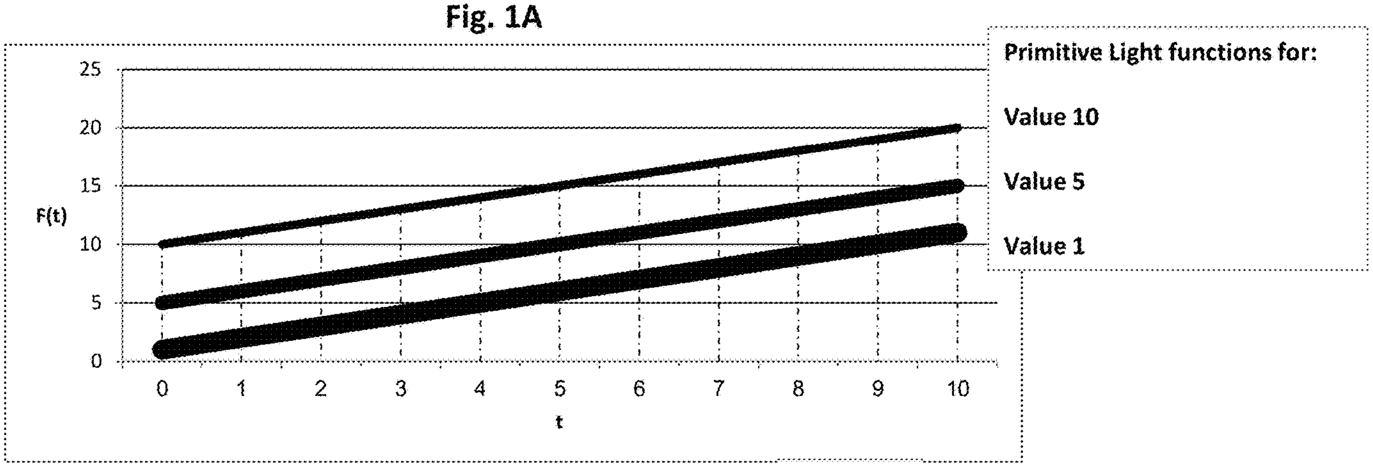

FIG. 1*a* is a table schematically showing a set of N=10 elements in the form of an ordered array. The elements can be, for example: 10 different brightness/intensity values of computer screens; the dimmer parameter of 10 different fixtures; they can be a combined array of pan/tilt parameters of one or more different fixtures, etc. The idea is that an element in the set is something that may receive a value. As mentioned, the array has an order which, for the rest of our examples, will stay as "left to right", if not stated differently. The order of the set is shown by Names in the first row of table in FIG. 1*a*, as "Value 1, Value 2 . . . Value 10.

Let us consider the simplest case, where each of the elements is a lighting instrument with a so-called single-parameter (a single-channel device called a dimmer), i.e. a primitive lamp having only one parameter/channel "intensity", which may be controlled at least in a binary manner (on-off), and possibly—by gradually raising or lowering its intensity.

Selection of elements, from a set of N elements, means choosing the available elements (fixtures) one after another, or in parallel, etc., by pointing out a) the name/number of the element (fixture) in the set of N elements, and b) the order/queue of its selection.

The desired order of selection is introduced as (i1) in the second row of the table shown in FIG. 1*a*, as a fixed sequence of queues or selection indexes 1, 2, 3 . . . 10. In FIG. 1*a*, the order of selection (i1) is equal to the order of the set. Let us describe a simple light effect known in the prior art. Let the effect has a linear function F(t)=t+i.

FIG. 1*b* shows that each fixture demonstrates a primitive light effect (function) being a linear function of intensity in time: only three functions are shown, the lower is for the fixture 1 called Value 1, the intermediate is for fixture 5 called Value 5 and the upper is for fixture 10 called Value 10. It can be noted, however, that the more the fixture's number in the set, the more the initial base of the function is (the base is actually stated by the order i1 in the set). Visually, while each of the fixtures increases its light intensity in time, intensity of the fixtures in the array/row (at a specific moment of time) will always be seen as increasing from 1 to 10 (see the direction of a vertical dashed arrow), i.e. in the same order i1 as in the initial set.

Figure 1C:
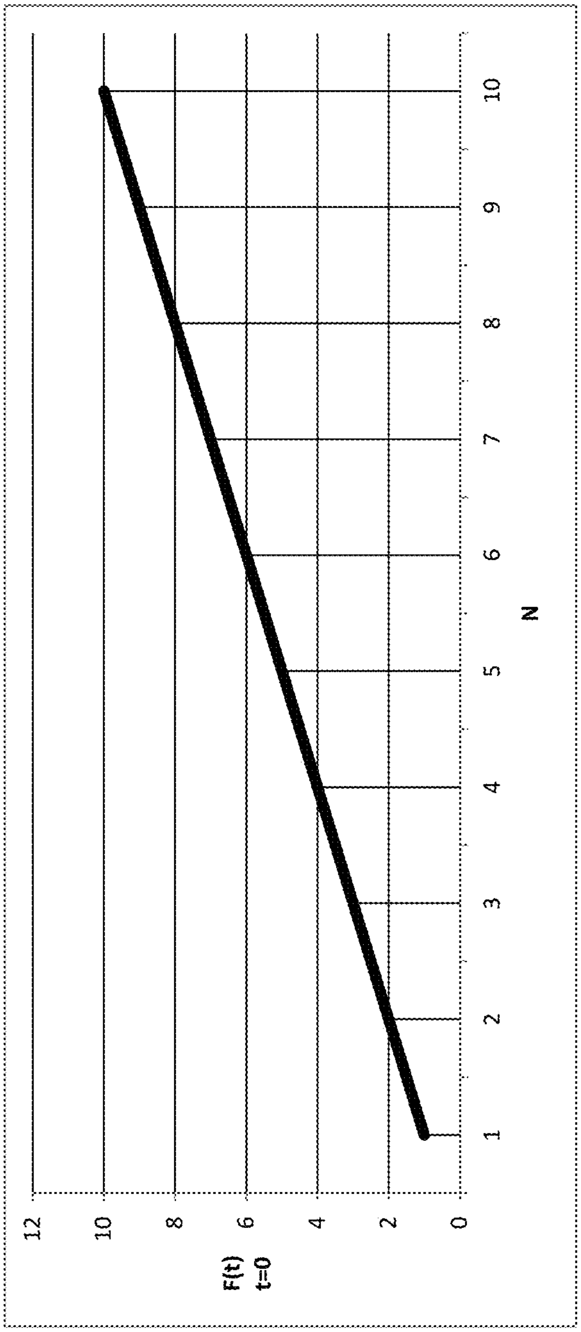

FIG. 1*c* presents a "snap-shot" of the effect at t=0, when the primitive light effect function F(t)=i1, and it actually demonstrates the order of selection of the fixtures in a row/array.

Figure 1D:
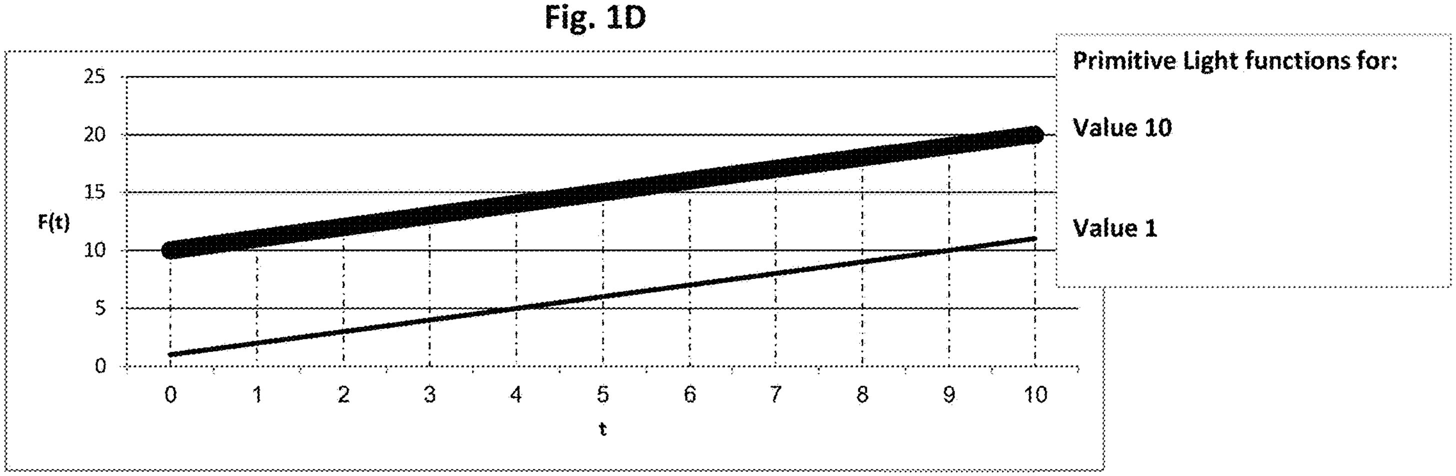

FIG. 1*d* shows another example, differing from the example of FIG. 1*a* in that the pre-selected order i2 is opposite to the order of elements/values in the set.

FIG. 1*e* shows that the linear functions of the primitive light function running on the elements of the set has changed so that now the highest initial base exists in the function of the first fixture.

It can be understood, while running the same linear light function by each of the fixtures (though only two functions are shown), intensity of the fixtures in the row will always be seen as increasing from value (fixture) 10 to value (fixture) 1, as shown by a vertical dashed arrow, i.e. as stated by order i2 for the elements Value1 . . . Value10 in the set.

Figure 1F:
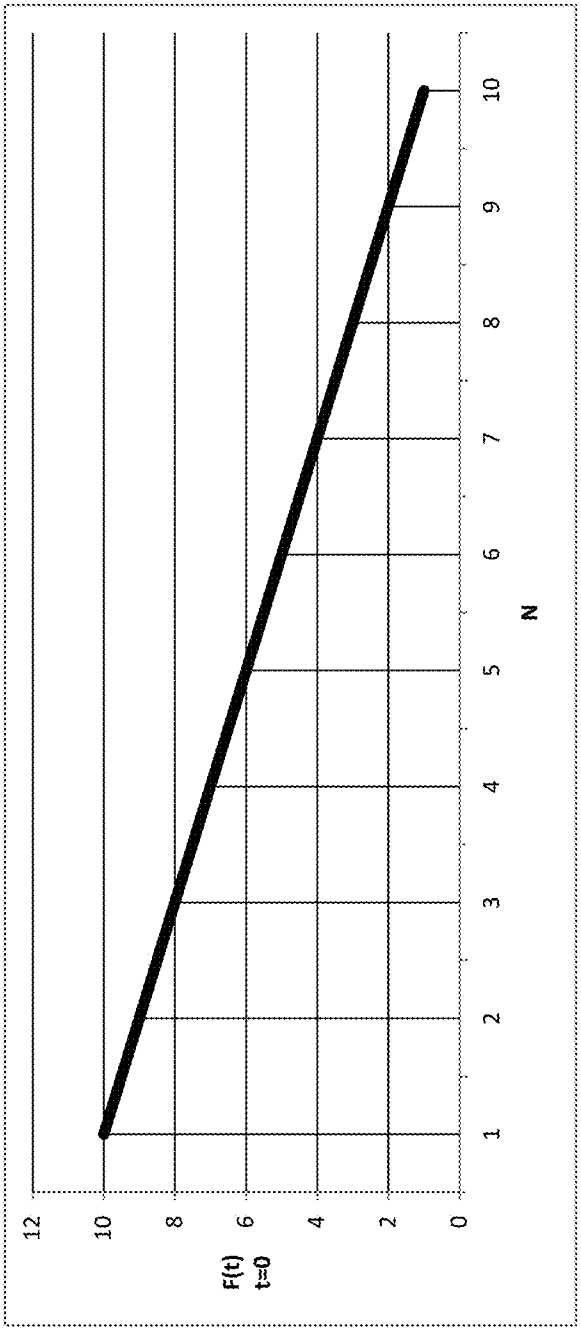

FIG. 1*f*. For t=0, the function will become F(t)=i2, and will actually demonstrate the linear order of selection of the fixtures in a row, but being inverse to the linear order shown in FIG. 1C.

The problem of the companies/systems known in the lighting market is that they control the order of selection in the fixed way. The most popular orders of selection are:

Left to Right; Right to Left; Edges to center (Mirror In); Center to edges (Mirror out).

It should be noted that in the mirror orders, some values get the same order (i). In all mentioned cases, the main issue is to directly/manually introduce and change the (i) value to the console controlling the performance, for each specific light effect.

Therefore, if we look at the most advanced function of modern light effects today, it may be written down somehow like the following formula.

$$\text{Output}=\text{Base}+(i*B')+(\text{Amplitude}+(i*A'))*\text{Eff}((\text{Time}*(i*R'))+(i*O')); \quad [9]$$

where:

i is the order of selection of elements from the given array of elements.

B' is some base coefficient.

A' is some amplitude coefficient.

Eff is the light effect function of time (a primitive light function such as sin, cos, linear, etc.)

R' is some rate coefficient.

O' is some time offset coefficient.

The formula [9] shows that (i) is a given variable. It means that when a different light console is selected to control the effect, or when the number of fixtures is changed, changes of the i value should be calculated before it is introduced in the formula [9].

Figures 2A, 2B:
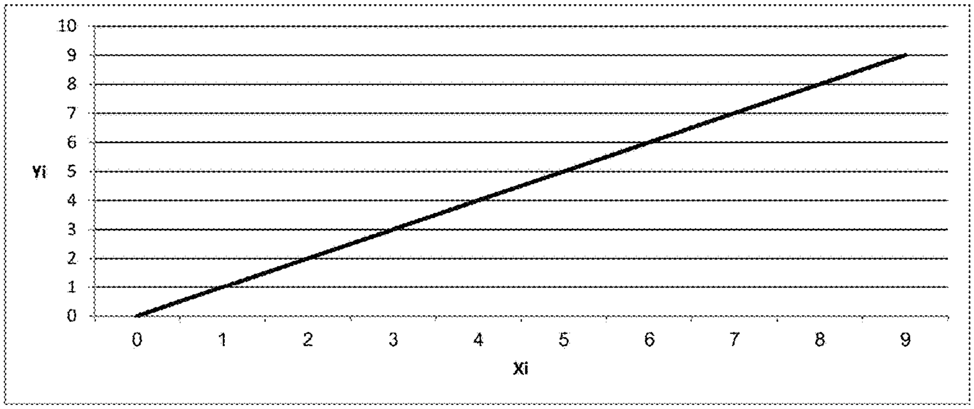
FIG. 2A, 2B, 2C 2D present a simplified illustration of the proposed method for determining order of selecting elements from a set, by a linear Pattern Function.

FIG. 2 illustrates one simple example of the proposed method, for controlling sequence/order of selecting elements from an ordered set of the elements. Let us use the same example of controlling an array of lighting instruments (fixtures), and see how the order of selecting fixtures may be calculated. Let a table of FIG. 2*a* shows the ten fixtures Value 1, Value 2 . . . Value 10 being ten elements of the ordered set/vector X. Let the order Xi of the elements in the set (x1, x2 . . . x10) is natural, from left to right, and let the order in the set has indications from 0 to 9, i.e. x1=0 . . . x10=9.

Let us use the Pattern function P(X)=[P(x1), P(x2), . . . P(x10)] for determining a new vector Y (y1, y2, . . . y10) being a vector of the selection order, so that Y=(y1, y2, . . . y10)=[P(x1), P(x2), . . . P(x10)].

If P(X)=X, the vector Y will be equal to vector X, i.e. Y=(y1, y2, . . . y10)=[P(x1), P(x2), . . . P(x10)]=(x1, x2, . . . x10).

In this case the selection order Y will be equal to the order in the set X.

FIG. 2*b* therefore demonstrates the direct linear dependence of Y from X.

Figures 2C, 2D:
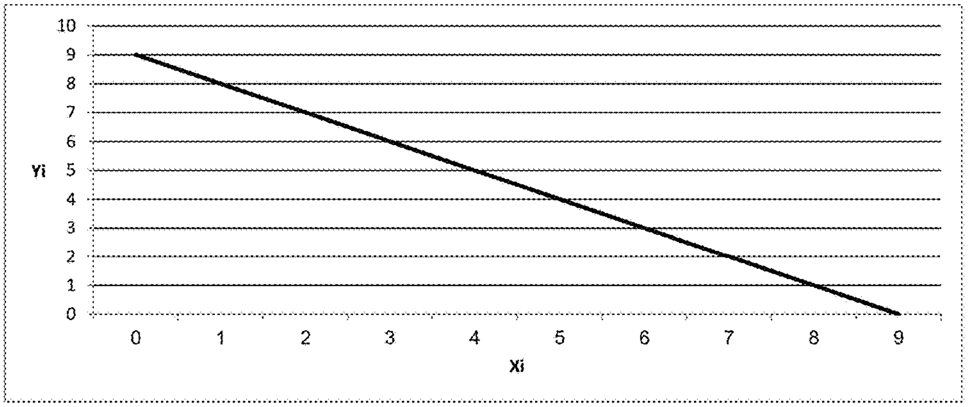

Now FIG. 2*c* will show the same ten fixtures Value 1, Value 2 . . . Value 10 being ten elements of the same ordered set/vector X. Let the order xi of the elements in the set (x1, x2 . . . x10) is the same, from left to right (see the indications of xi from 0 to 9).

Let us use another Pattern function $P(X)=(x_{max}-x_i)$ to determine a vector Y (y1, y2, . . . y10) being a vector of the selection order, so that Y=(y1, y2, . . . y10)=[P(x1), P(x2), . . . P(x10)].

With the new P(X), the vector Y will be opposite to vector X, i.e. Y=(y1, y2, . . . y10)=[P(x1), P(x2), . . . P(x10)]=(x10, x9, . . . x1).

FIG. 2*d* is drawn to demonstrate the inverse linear dependence of Y from X, for the Pattern function $P(X)=(x_{max}-x_i)$, where $x_{max}=9$.

Though the linear examples of FIG. 2 seem to be quite trivial and similar to those shown in FIG. 1, they persuade a) that the selection indexes, which usually were specifically calculated for each occasion, can be now obtained automatically, and b) that other, much more complex pattern functions can be applied when complex effects in time are required.

Any additional coefficients, bases, amplitudes and offsets may be added to create a function F(t) of a light effect, using any desired Pattern function which will determine a suitable order of selection of elements from the set X during the effect.

FIGS. 3 (A-H) illustrate further examples, where the pattern functions are normalized—so that the user will not have even think about the quantity of elements in the set: both in the beginning and in any case when the number of elements is changed. A so-called normalized Pattern function will enable determining order of selection for any number of elements in the set, while preserving the same effect on the set.

Figures 3A, 3B:
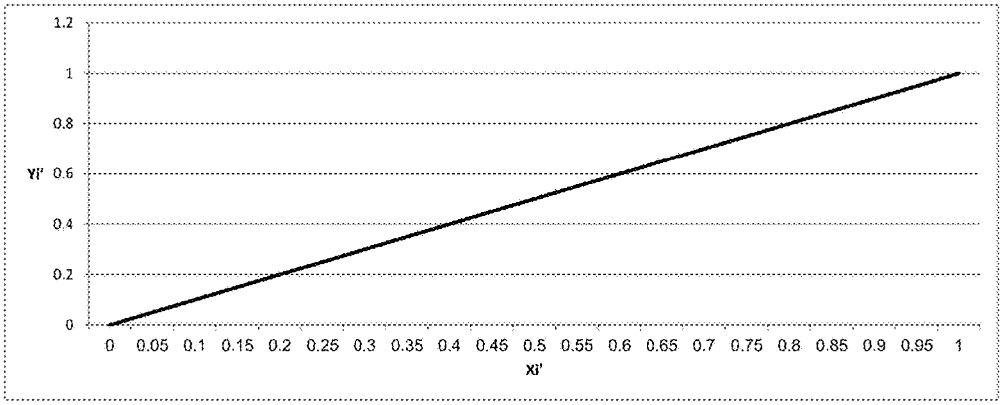
FIGS. 3A-3H are schematic illustrations of the proposed method, using various Pattern functions defined on normalized intervals.

FIGS. 3A and 3B: Let N elements in the ordered set are 21 fixtures, and their order in the set is marked in FIG. 3A as Xi, from 0 to 20. The order of the elements in the set is from left to right, similarly to that in FIGS. 2A, 2C (though the set of FIGS. 3*a*, 3*b* comprises more elements that that of FIGS. 2A, 2C).

FIG. 3A shows, however, an additional row of a so-called normalized order X' of the set X, the row comprising normalized order values xi, running in the normalized interval from 0 to 1. The normalized Pattern function will be a function of the normalized order X' of the set. Let in this example P(X')=X'.

$$Y=P(X')=[P(x1'),P(x2'), \ldots P(xN')].$$

As can be seen in FIG. 3A, and in FIG. 3B which is a graph of the normalized Pattern function p(X'), the function P(X') successfully determines elements of the vector Y (i.e., selection indexes yi' for all normalized elements xi' within the normalized interval 0-1 on the axis Y). The function remains a direct linear function, but its is independent from the number N of elements in the set X.

Figures 3C, 3D:
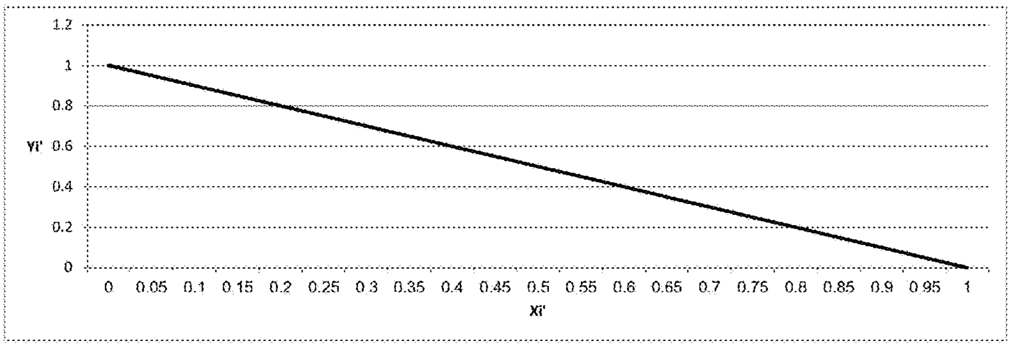

FIGS. 3*c* and 3*d* illustrate a table and a graph of a normalized Pattern Function which is an inverse function P(X')=1−X'.

It can be seen that the order of selection (Y) is changed to the opposite direction. Of course it does not really matter whether this was done on 10 channels/fixtures or 1000 channels/fixtures, since the calculation is done per element of the vector (per single channel), so that each specific xi' will be different (in the normalized form).

It should be noted that the examples of linear functions given in FIGS. 2 and 3 are for simplicity only, and any type of a 2D Pattern function may be utilized as proposed by the Inventors, both as is, and in its normalized form.

For example, the Pattern functions may be sinusoidal, parabolic, asymptotic, mirror-like, etc. with any desired coefficients, bases and offsets. Some of them will be shown in FIGS. 3 and 4.

Moreover, complex light effect functions may be built using more than one Pattern functions controlling the mentioned base, amplitude, coefficients, and offsets (for example, as in formula 8 of the description).

Figures 3E, 3F:
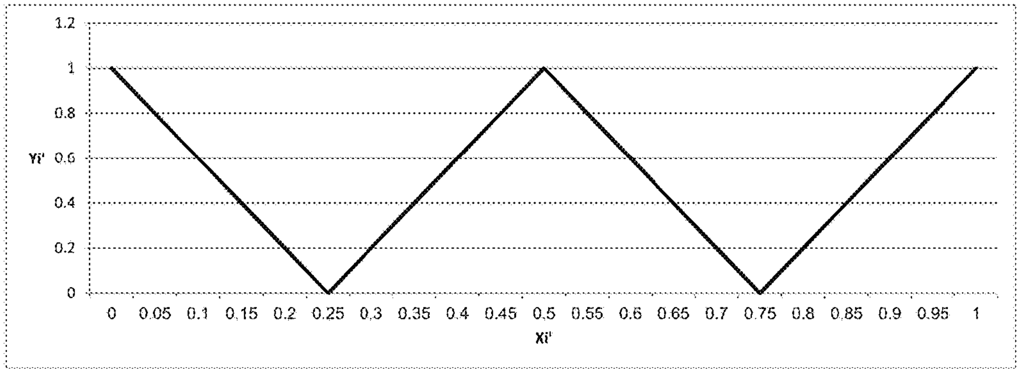

FIGS. 3E, 3F show a table and a graph of a W-like function $$Y=P(X')=|1-2*(1-2X'|)|;N=21,$$

comprising two sections of a so-called Inner Mirror function $$P(X')=|1-2X'|;N=10;$$

The complete set X of 21 fixtures may be virtually divided into two sub-sets of 10 fixtures (the border fixture being the one having the normalized order xi'=0.5 belongs to both sub-sets).

In any Inner Mirror function, the middle fixture is activated first (yi'=0), and the first and last fixtures (of the sub-set in this case) are activated last (yi'=1). In the example of FIGS. 3E, 3F, two center fixtures of the two sub-sets xi'=0.25 and xi'=0.75 will be activated the first, then the fixtures will be symmetrically activated "to the outside" from the centers, so that the edge fixtures and the border (center) fixture of the set X will be activated the last.

Figures 3G, 3H:
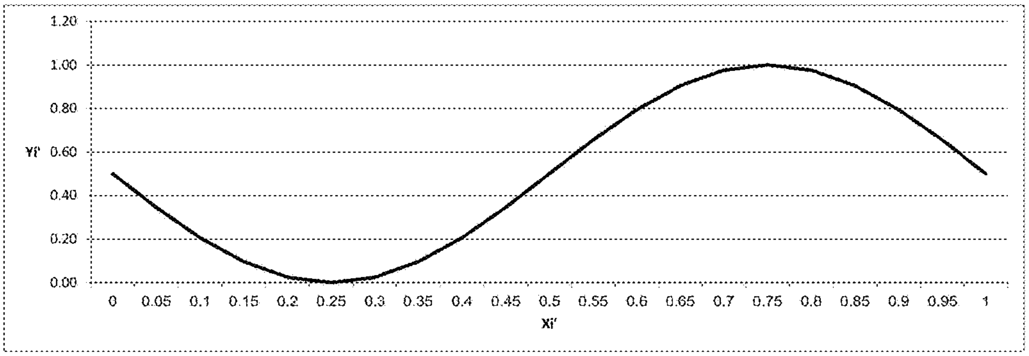

FIGS. 3G, 3FH demonstrate another Pattern function which produces a sinus-like order of selecting elements from the same set X of N elements, wherein the elements are ordered and normalized in the set.

$$Y=P(X')=[\sin(2\pi X'-\pi)]/2=0.5;N=21$$

This function may be formed from two parabolic portions, by dividing the set X into two sub-sets similarly to the approach used in FIGS. 3E, 3F. The first sub-set starts and produces the left-hand parabolic portion of the function. Once the first sub-set finishes its activity, the second sub-set starts and produces the inverse, right-hand parabolic section of the function.

Figure 4B:
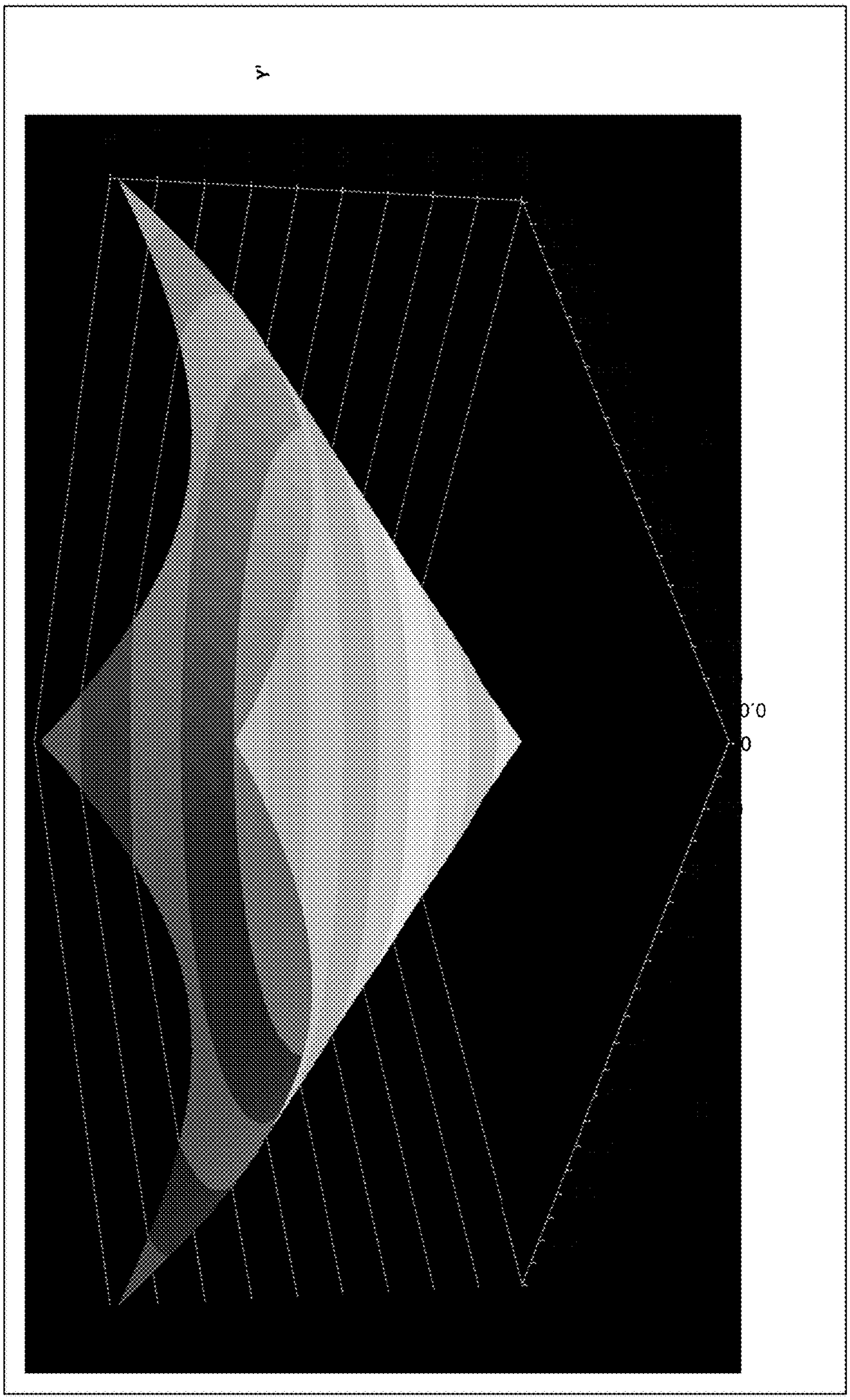

FIGS. 4A, 4B illustrate one possibility of a 3D Pattern function. Let we have a 2D array/set of fixtures, and the coordinates of the fixtures in the array may be written down by using two axes X1 and X2. Let the fixtures' coordinates along both of these axes have values −5, −4.5 . . . 0, 0.5, . . . 5. These coordinates indicate order of the elements (fixtures) in the sets X1 and X2. Let the both of the coordinates axes are normalized, so that the normalized coordinate (0.5, 0,5) corresponds to the original coordinate (0,0) in the 2D array. Let the Pattern function is a so-called 3D cone: $P(X1', X2')=\sqrt{}(X1'^2+X2'^2)$; N(X1)=N(X2)=21.

FIG. 4B visualizes the order of activation of the fixtures in the 2D set. Different shades of the black color illustrate graduate selection of various fixtures in the set, according to their normalized order.

Other 3D functions may be built for a 2D array of fixtures, if the fixtures are defined by space coordinates. A 4D function may theoretically be built for a 3D array of fixtures in the analogous manner.

Alternatively, in such 2D or 3D uniform arrays the fixtures may be just numbered and thus controlled as a simple 1D vector.

Sets of elements having 2D or 3D coordinates may be useful also when these coordinates are not uniform.

For example, the axis X1 may comprise a set X1 of five values of the Pan parameter for a group of fixtures. The axis X2 may comprise a set X2 of five values of the Tilt parameter for the same group of fixtures.

Figure 5:
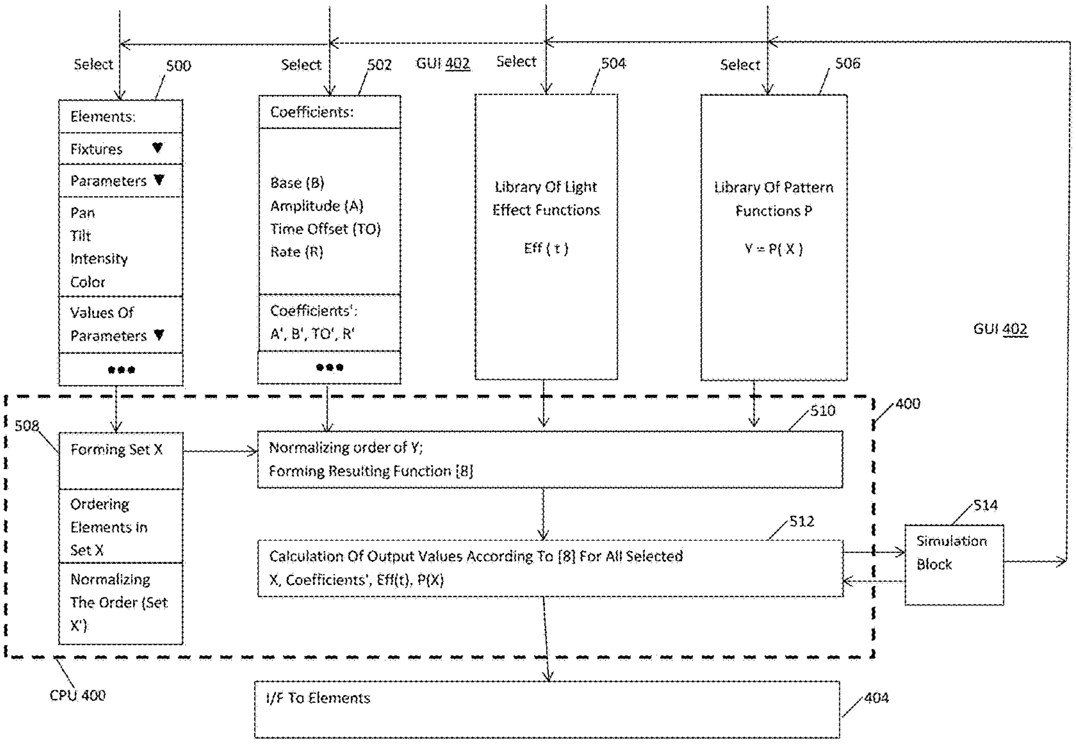
FIG. 5 is a schematic block diagram of one embodiment of the system according to the invention.

FIG. 5 shows a schematic block-diagram of one embodiment of the proposed control system for implementing the inventive method.

The system schematically shown in FIG. 5 is a specific example of a control console which manipulates fixtures by creating a combined function similar to that defined by [8] in the present description. The console comprises the following main units:

- a central processing unit (CPU) 400 interconnected with a memory which, inter alia, comprises a number of Data Bases which will be mentioned below,
- a graphical user interface (GUI) 402, interconnected with the memory and visualizing the Data Bases (500, 502, 504, 506) which are accessible from the GUI for preparing data for the CPU; preferably, GUI also visualizes a simulation block 514 which may be part of CPU, or constitute a separate unit;

an interface 404 for forwarding control information, produced in the CPU, to the physical devices.

The operator selects, via GUI 402, elements for one or more sets X to be controlled. Preferably but not mandatory, it is one common set per one function [8]. For example, from respective data bases—generally marked 500 and accessible from GUI 402—the operator may select fixtures, parameters of the fixtures, values of the parameters for one or more sets X. The CPU then forms the set X from the selected elements by arranging the elements in a specific order in the set and (preferably) by normalizing the order (block 508). The order of the selected set is usually set by default, but may optionally be changed by the operator.

For a specific planned light effect, the operator selects a light effect function from a Library 504 of Light Effect Functions, via the GUI. The Library/Data Base 504 preferably comprises primitive functions of time. However, as noted before, the light effect function may be a pattern function, and in this case such a function may be selected either from Data base 504 if it comprises such functions, or from Data Base/Library 506.

The operator then selects one or more coefficients such as Amplitude (A), Base (B), Time Offset (To), Rate (R) for the selected light effect function, from a symbolically shown Data Base 502, via the GUI.

One or more Pattern functions may be further selected from Data Base 506 to apply additional control to the respective coefficients A, B, To, R.

For these selected Pattern functions (respectively controlling A, B, To, R), the operator may also select corresponding coefficients A', B', To', R' from the Data Base 502.

All data about the selected set(s), light effect function, pattern functions and various coefficients is forwarded to the Central Processing Unit 400. The CPU, based on the received data, forms the combined equation similar to [8] for the planned Light Effect (Block 510 of the CPU). Optionally, the interval of the selected Pattern function(s) Y is also normalized. This can be called “normalizing the order of Y”.

The processor CPU then calculates the Output values (in our example, block 512 operating according to formula [8]). Results of the calculation are preferably checked by the simulation block 514. If the operator (or software) confirms the result, the CPU issues the Output values to the Interface 404 which converts them to control commands for the fixtures to be controlled. If the simulation is not satisfactory, any of the selections may be adjusted (see the arrows from block 514 towards blocks 500, 502, 504, 506).

It goes without saying that any or all of the functions/coefficients may be constants, and the equation [8] may acquire a basic form of a primitive light function or a single pattern function.

Figure 6:
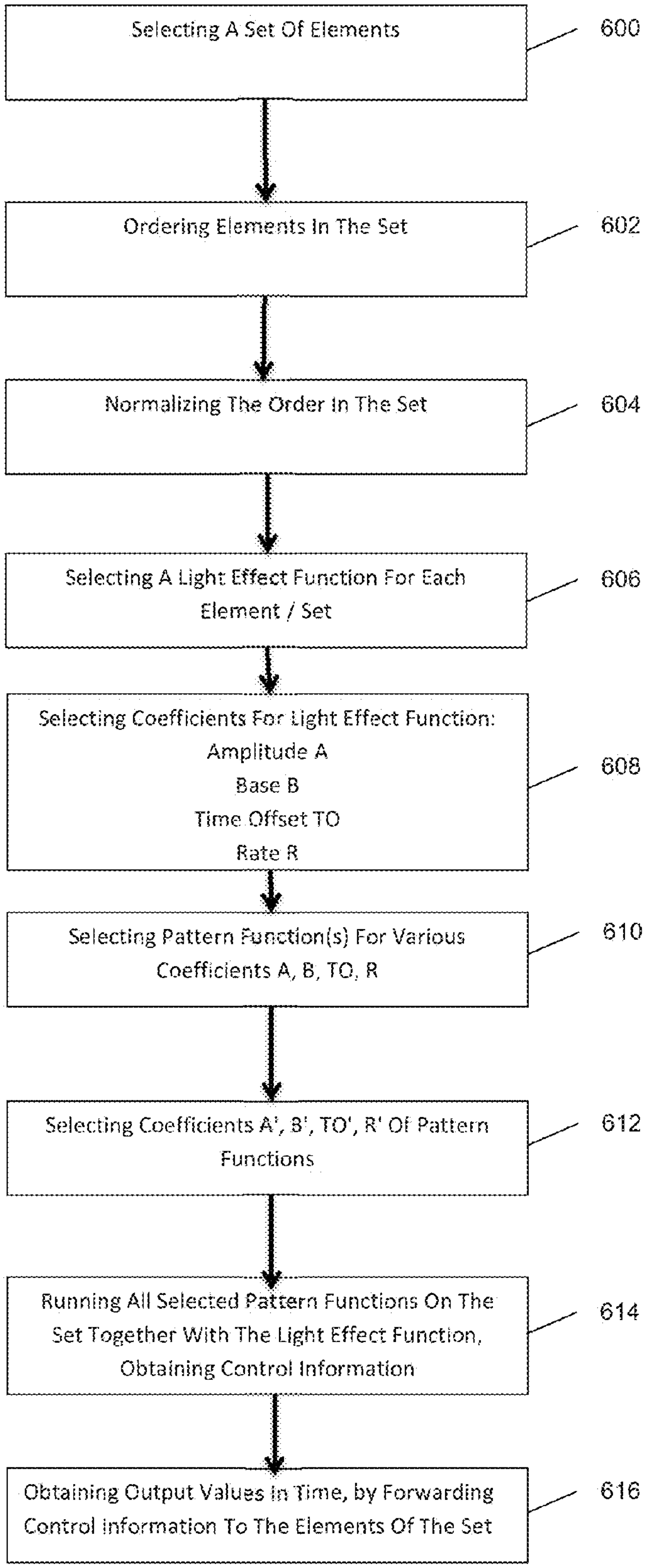
FIG. 6 is a schematic flow chart of one version of the method according to the invention.

FIG. 6 shows a flow-chart of an exemplary algorithm for implementing the method of the invention, more particularly for controlling a set of elements according to equation [8], for example by a control console shown in FIG. 5.

Box 600: selecting one or more sets of elements for controlling them. In a specific case, it may be one common set (X). The elements may be fixtures, items or potions thereof, parameters of the fixtures, the parameters values, etc.

Box 602: ordering the elements in the set, i.e. determining order in the set by assigning “xi” for each element.

Box 604: normalizing the order in the set, i.e. modifying the order values “xi” to be found between 0 and 1 (or 0 and 100%).

Box 606: selecting a Light Effect Function(s) which will run on each specific element in the set. The Light Effect function (Eff) may be a primitive light function—for example a linear function, or a “sin” function of the fixture’s intensity in time. However, the light effect function may be a pattern function, for example adapted to control intensity of the fixture.

Box 608: selecting one or more coefficients for the Light Effect Function, e.g. its amplitude (A), base (B), time offset (To) and Rate (R).

Box 610: selecting one or more Pattern functions (such as Pa, Pb, Pr, Pto) for controlling the respective coefficients A, B, R, To of the Light Effect Function. In other words, any of the coefficients (A, B, To, R) may change according to its own Pattern function. The interval of any of the Pattern functions may also be normalized, to be found between 0 and 1.

Box 612: Selecting coefficients for the selected Pattern Functions Pa, Pb, Pr, Pto. These coefficients will respectively be A', B', R', To'.

Box 614: All the selected Pattern functions, together with the Light Effect Function(s) are run with their coefficients on the selected set X (or more sets if defined) in the processor of the control console, according to equation [8]. Based on the obtained results, the console produces control information for elements of the set X (or more sets if selected and processed).

Box 616: The control information from the console is forwarded to the elements (fixtures, its parameters, values), and finally output values of the fixtures are obtained.

Before forwarding the control information to the elements, simulation may be performed to check and adjust the expected combined light effect (not shown in FIG. 6).

While the invention has been described with reference to a number of limited examples, it should be appreciated that other versions of the method and embodiments of the system may be proposed and are to be considered as forming part of the invention, whenever defined by the claims which follow.

The invention claimed is:

1. A method for controlled lighting of a stage using controlled selection of stage lighting elements from an ordered set of N stage lighting elements, implemented using a computer system comprising a computer processor and a non-transitory computer readable memory, the method comprising:

applying to the ordered set, via the computer processor, a function P to change the order in which said stage lighting elements are ordered in the ordered set, into a desired order defined by said function P, for further selection said stage lighting elements from the set according to the desired order;

wherein the ordered set is formed by said N stage lighting elements selected from at least one of the following: fixtures, internal units of the fixtures, fixture parameters, values of said parameters, and values of coefficients, and wherein the method further comprises:

ensuring, via the computer processor, that said ordered set is presentable as a vector X comprising N stage lighting elements $x_i$:

$$X=(x1,x2 \ldots xN),\ \text{where } x_i \in X (i=1, \ldots N); \quad [2]$$

selecting, via the computer processor, said function P being at least a 2D function defined between at least two orthogonal axes, wherein a first of said at least two axes is used for defining the N stage lighting elements ordered in the set, and a second of said at least two axes is used for determining selection indexes reflecting the order of selecting said stage lighting elements from the set;

running, via the computer processor, the function P on the vector X, so that:

$$P(X)=[P(x1),P(x2), \ldots P(xN)], \quad [3];\text{ and}$$

controlling, via the computer processor, by said function P, the order of selecting stage lighting elements $x_i$ from the set by associating the stage lighting elements $x_i$ with selection indexes $y_i$ presentable as a vector Y:

$$P(X)=Y=(y1,y2 \ldots yN),\text{ where } y_i \in Y(i=1, \ldots N) \quad [4];$$

selecting, via the computer processor, the stage lighting elements from said set according to the desired order defined by said function P; and operating, via the computer processor, the selected stage lighting elements from said set according to the desired order, to create convertible and adjustable lighting effects for various kinds of stages.

2. The method according to claim 1, further comprising accessing, via the computer processor, the selected stage lighting elements according to the desired order defined by said function P.

3. The method according to claim 2, wherein said accessing comprises at least one of the following: switching said devices, accessing said items, initiating said parameters, setting values of parameters or coefficients.

4. The method according to claim 1, further comprising:

selecting, via the computer processor, the stage lighting elements from the set in the desired order, according to selection indexes defined by said function P;

accessing, via the computer processor, the selected stage lighting elements in the desired order, according to selection indexes defined by said function P.

5. The method according to claim 1, wherein two or more said functions P are run simultaneously by the computer processor to control sequence of selection on one or more said ordered sets of stage lighting elements.

6. The method according to claim 1, wherein said function P is a two-dimensional (2D) or a three-dimensional (3D) function respectively defined between two or three orthogonal axes.

7. The method according to claim 1, wherein the function P is a 3D function run on a combined set formed by interposition of two said sets, each defined on one of two mutually orthogonal axes.

8. The method according to claim 7, wherein said combined set is formed by interposition of a first ordered set X1 of N stage lighting elements and a second ordered set X2 of M stage lighting elements, wherein set X1 is a normalized set ||X1|| defined on the normalized interval:

$$\|X1\|=(x11',x12' \ldots x1N'),\text{ where } x1i \in \|X1\|(i=1', \ldots N'), \quad [5]$$

wherein the normalized vector ||X1|| is such, that indexes of N e stage lighting elements thereof are normalized to vary between 0 and 1; and set X2 is a normalized set ||X2|| defined on the normalized interval:

$$\|X2\|=(x21',x22' \ldots x2M'),\text{ where } x2i \in \|X2\|(i=1', \ldots M'), \quad [5]$$

wherein the normalized vector ||X2|| is such, that indexes of M stage lighting elements thereof are normalized to vary between 0 and 1.

9. The method according to claim 1, wherein the set of N stage lighting elements and the function P are defined on a normalized interval on said first axis.

10. The method according to claim 9, wherein a normalized set ||X|| is defined on the normalized interval:

$$\|X\|=(x1',x2' \ldots xN'),\text{ where } x_i \in \|X\|(i=1', \ldots N'), \quad [5]$$

wherein the normalized vector ||X|| is such, that indexes of N stage lighting elements thereof are normalized to vary between 0 and 1.

11. The method according to claim 1, wherein the function P serves for creating a light effect.

12. The method according to claim 11, wherein the function P called a pattern function serves for creating the light effect in time, close to the following combined light effect function:

$$\text{Output}=B+A^*\text{Eff}(t+P(xi)T),\text{ where:} \quad [7]$$

Output—value related to the element on which a light effect function is run;

Eff—a light effect function;

P—a pattern function creating selection indexes from xi;

B—a base predetermined for the function Eff;

A—an amplitude of the function Eff;

t—time;

xi indicates order of elements in a set of N stage lighting elements; and

T is a time offset up to selecting a following stage lighting element from the set.

13. The method according to claim 11, comprising controlled selection of base, amplitude, rate, time offset of the light effect by the computer processor using respective pattern functions Pb, Pa, Pr, Pto, substantially close to the following combined light effect function:

$$\text{Output}=B+(Pb(xi)^*B')+(A+(Pa(xi)^*A'))\text{Eff}((t^*(Pr(xi)^*R'))+(Pto(xi)^*TO'); \quad [8]$$

wherein:

Eff is a light effect function;

Pb is a pattern function to control the base selection order; B'—coefficient of Pb;

Pa is a pattern function to control the amplitude selection order; A'—coefficient of Pa;

Pr is a pattern function to control the rate selection order; R'—coefficient of Pr;

Pto is a pattern function to control the time offset selection order; and

TO'—coefficient of Pto.

14. A control system for controlled lighting of a stage by controlling selection of stage lighting elements from an ordered set of N stage lighting elements, the system comprising:

a computer processor;

a non-transitory computer readable memory connected to the computer processor, the non-transitory computer readable memory storing a database of records representing the stage lighting elements;

a graphical user interface for visualizing the controlled selection of the stage lighting elements to achieve a lighting effect;

the computer processor being configured to execute instructions to:

apply to said ordered set at least one function P to change the order in which said stage lighting elements are arranged in the set, into a desired order for further selecting the stage lighting elements from the set, wherein the ordered set is formed by said N stage lighting elements selected from at least one of the following: fixtures, internal units of the fixtures, fixture parameters, values of said parameters, and values of coefficients, and wherein in the control system:

said ordered set is stored in the non-transitory computer readable memory as a vector X comprising N elements $x_i$:

$$X=(x1,x2 \ldots xN), \text{ where } x_i \in X (i=1, \ldots N); \quad [2]$$

said function P is at least a 2D function defined between at least two orthogonal axes, a first of said at least two axes is used for defining the N stage lighting elements ordered in the set, and a second of said at least two axes is used for determining selection indexes reflecting the order of selecting said stage lighting elements from the set;

the computer processor is configured to:

apply said at least one function P is applied to said ordered set by running the function P on the vector X, and so that:

$$P(X)=[P(x1),P(x2), \ldots P(xN)], \quad [3]$$

control, by said function P, the order of selecting stage lighting elements $x_i$ from the set by associating them with selection indexes $y_i$ presentable as a vector Y:

$$P(X)=Y=(y1,y2 \ldots yN), \text{ where } y_i \in Y(i=1, \ldots N) \quad [4];$$

select the stage lighting elements from said set according to the desired order defined by said function P; and operate the selected stage lighting elements from said set according to the desired order, to create convertible and adjustable lighting effects for various kinds of stages.

15. The control system according to claim 14, designed for creating and controlling a light effect, the computer processor being configured to calculate a combined light effect function utilizing said function P, and to access the selected stage lighting elements to create and control the light effect by applying to them said combined light effect function.

16. The control system according to claim 15, wherein the non-transitory computer readable memory further comprises a library of functions P, and a library of Light Effect functions;

wherein the graphical user interface is further configured to display one or more functions for creating the light effect, and coefficients for the selected functions, and wherein said computer processor is configured to order the selected set, normal the order in said set and calculate said combined light effect function.

17. A software product embodied on a non-transitory computer readable storage medium, the software product comprising computer readable instructions and data for implementing the method according to claim 1, said instructions and data being stored on the non-transitory computer readable storage medium and the software is configured to perform operations of said method when executed by the computer processor.

18. A software product embodied on a non-transitory computer readable memory and comprising computer implementable instructions and data for carrying out a method for controlled lighting of a stage using controlled selection of stage lighting elements from an ordered set of N stage lighting elements, by applying to the set a function P to change the order in which said stage lighting elements are ordered in the set, into a desired order defined by said function P, for further selection said stage lighting elements from the set according to the desired order;

wherein the stage lighting elements are selected from at least one of the following: fixtures, internal units of the fixtures, fixture parameters, values of said parameters, and values of coefficients, wherein the instructions are configured, when executed by a computer processor in a computer system, to:

present said ordered set as a vector X comprising N stage lighting elements $x_i$:

$$X=(x1,x2 \ldots xN), \text{ where } x_i \in X(i=1, \ldots N); \quad [2]$$

select said function P as at least a 2D function defined between at least two orthogonal axes, wherein a first of said at least two axes is used for defining the N stage lighting elements ordered in the set, and a second of said at least two axes being used for determining selection indexes reflecting the order of selecting said stage lighting elements from the set;

run the function P on the vector X, so that:

$$P(X)=[P(x1),P(x2), \ldots P(xN)], \quad [3],$$

control, by said function P, the order of selecting stage lighting $x_i$ from the set by associating them with selection indexes $y_i$ presentable as a vector Y:

$$P(X)=Y=(y1,y2 \ldots yN), \text{ where } y_i \in Y(i=1, \ldots N), \quad [4],$$

select the stage lighting elements from said set according to the desired order defined by said function P; and operate the selected stage lighting elements from said set according to the desired order, to create convertible and adjustable lighting effects for various kinds of stages.

* * * * *